United States Patent
Philip

(10) Patent No.: US 9,425,685 B2
(45) Date of Patent: Aug. 23, 2016

(54) DC-DC VOLTAGE CONVERTER AND CONVERSION METHOD

(71) Applicant: NXP B.V., Eindhoven (NL)

(72) Inventor: Melaine Philip, Blainville-sur-Orne (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/565,264

(22) Filed: Dec. 9, 2014

(65) Prior Publication Data
US 2015/0162824 A1   Jun. 11, 2015

(30) Foreign Application Priority Data
Dec. 11, 2013   (EP) .................... 13290311

(51) Int. Cl.
| H04B 1/40 | (2015.01) |
| H02M 3/07 | (2006.01) |
| H02M 1/44 | (2007.01) |
| H02M 3/158 | (2006.01) |
| H02M 1/088 | (2006.01) |
| H02J 7/00 | (2006.01) |

(52) U.S. Cl.
CPC .............. *H02M 1/44* (2013.01); *H02J 7/0063* (2013.01); *H02M 1/088* (2013.01); *H02M 3/07* (2013.01); *H02M 3/158* (2013.01); *H04B 1/40* (2013.01)

(58) Field of Classification Search
CPC combination set(s) only.
See application file for complete search history.

(56) References Cited

U.S. PATENT DOCUMENTS

| 5,680,300 | A * | 10/1997 | Szepesi | H02M 3/07 363/59 |
| 6,069,521 | A | 5/2000 | Taylor et al. | |
| 6,107,862 | A * | 8/2000 | Mukainakano | H02M 3/07 327/536 |
| 6,819,163 | B1 * | 11/2004 | Gregoire, Jr. | G05F 3/262 327/536 |
| 7,375,992 | B2 * | 5/2008 | Mok | H02M 3/07 363/60 |
| 8,629,935 | B2 * | 1/2014 | Kikuchi | H04N 5/23241 348/241 |
| 2002/0034082 | A1 * | 3/2002 | Yokomizo | H02M 3/07 363/16 |
| 2003/0038669 | A1 * | 2/2003 | Zhang | H02M 3/07 327/536 |
| 2006/0186948 | A1 | 8/2006 | Kelly et al. | |
| 2010/0127739 | A1 * | 5/2010 | Ebuchi | H03L 7/0898 327/148 |
| 2011/0130093 | A1 * | 6/2011 | Walley | G06K 7/10207 455/41.1 |
| 2013/0194031 | A1 * | 8/2013 | Poulton | H04L 25/0272 327/536 |
| 2013/0195291 | A1 * | 8/2013 | Josefsson | H02M 3/07 381/174 |
| 2014/0281383 | A1 * | 9/2014 | Dally | G06F 15/7864 712/42 |
| 2015/0145495 | A1 * | 5/2015 | Tournatory | H02M 3/156 323/282 |

* cited by examiner

*Primary Examiner* — Cindy Trandai

(57) ABSTRACT

A DC-DC converter uses a switched capacitor arrangement. A filter capacitor is connected between one terminal of the capacitor arrangement and a fixed voltage line and a calibration arrangement is used for setting or enabling selection of the capacitance of the filter capacitor.

In this way, a capacitance is added to a terminal of the switched capacitor arrangement. The capacitance value can be chosen or adjusted to keep the DC-DC converter current capability within specification limits.

15 Claims, 8 Drawing Sheets

P3 → P2

P3 → P2

DC-DC VOLTAGE CONVERTER AND CONVERSION METHOD

CROSS-REFERENCE TO RELATED APPLICATIONS

This application claims the priority under 35 U.S.C. §119 of European patent application no. 13290311.3, filed on Dec. 11, 2013, the contents of which are incorporated by reference herein.

FIELD

This application relates to DC-DC voltage converters, for creating a regulated voltage output from a voltage input, which input voltage may vary. The output voltage can have a higher or lower value than the input voltage, and it is stable even though the input voltage and the output load may change.

BACKGROUND

Switching capacitive DC-DC voltage converters typically use "flying capacitors". These capacitors are charged from the input voltage and then discharged to the load thus providing charge transfer and a constant output voltage.

FIG. 1 shows a basic known DC-DC converter circuit.

The circuit comprises a switching capacitor Csw. One terminal SAP is connected to the input through a first switch S1 and to the output through a third switch S3. The other terminal SAM is connected to the input through a fourth switch S4 and to ground through a second switch S2.

Basic DC-DC converters of this type integrate switches S1 to S4 and an oscillator so that the switches work alternately in pairs S1,S2 and S3,S4.

The oscillator output is shown as a clock signal Clk, and it is passed to the switches in dependence on whether the output voltage VOUT has reached a target voltage Vref. An AND gate 10 controls the passing of the clock signal, and a comparator compares the output voltage (or a voltage derived from the output voltage) with the reference level Vref. The comparator output is used to control whether the AND gate passes the clock signal. The comparator output is thus a control signal PUMP which controls the converter pumping. When it is high, the cyclic charge pumping is enabled, and when it is low, the cycles are halted, The configuration shown doubles the input voltage.

The DC-DC converter operates in two phases, sequenced by the clock. Closing switches S1 and S2 charges the flying capacitor Csw to the input voltage Vin in a first half cycle (storing phase). In the second half cycle, switches S3 and S4 close and switches S1 and S2 open (loading phase). This action connects the negative terminal SAM of Csw to Vin and connects the positive terminal SAP to VOUT. If the voltage across the output load Cload is smaller than that across Csw, charge flows from Csw to Cload.

The storing phase and loading phase occur alternately, boosting the DC-DC converter output voltage until its target value Vref is reached. When VOUT reaches Vref, the switching clock is stopped, and then the DC-DC converter stays in the storing phase.

As soon VOUT goes below Vref, the DC-DC converter restarts pumping, alternating the storing and loading phases until VOUT again rises above Vref.

The DC-DC converter output voltage should be regulated within a voltage window by using a voltage hysteresis of the comparator 12. In this way, VOUT is regulated between Vref and Vref+Hyst. The threshold voltage for the VOUT rising edge is Vref+Hyst, and the threshold voltage for the falling edge is Vref.

FIG. 2 shows this operation, and shows the voltage waveform of the output voltage VOUT, which fluctuates between Vref and Vref+Hyst.

During a start-up time, the DC-DC converter pumps energy from Vin to VOUT, and VOUT rises to Vref+Hyst. The DC-DC converter then stops by staying in a storing state. This is shown as phase P1, and it corresponds the signal PUMP being low, waiting for the output voltage to drop back to Vref.

During phase P1, VOUT falls linearly due to the output load current until Vref, and then the DC-DC converter restarts to boost VOUT until Vref+Hyst. This boosting involves alternate loading phases P2 and storing phase P3.

This application relates in particular to the transient behaviour of the circuit. FIG. 3 shows the storing P3 and loading P2 phases of the circuit including the on-resistances of the switches.

The transient behaviour of the output VOUT and the capacitor terminals SAP and SAM over three phases (store P3, then load P2, then store P3) is shown in FIG. 4, taking account of the resistive elements.

FIG. 4 is a zoom in to the output voltage VOUT when the DC-DC converter is in steady state. Thus, the time t=0 is simply used to provide a reference point at which voltages VOUT0 and SAM0 are defined.

The maximum voltage SAPmax on on the node SAP is shortly after the beginning of phase P2 (i.e. a short time ε after the reference time t=0). At the beginning of each phase, the flying capacitor can be considered as a short circuit.

Thus, the circuit configuration when switching from phase P3 to P2 is as shown in FIG. 5.

At t=0, the voltage on terminal SAM is equal to VOUT divided by two. The maximum voltage SAPmax is given by SAM0 plus VIN. So the maximum voltage is equal to:

$$SAPmax = VOUT0/2 + VIN$$

The model used to create the timing diagrams of FIG. 4 is based on the simulation of an ideal DC-DC converter. However, in reality during the switching transition phase a higher voltage is seen on the SAP pin. This difference between a real silicon device and the model can be explained by introducing parasitic variables.

By introducing parasitic variables derived from the DC-DC converter power switches and from the output electrical line, the initial condition on SAM before phase P2 is modified.

FIG. 6 shows the circuit with parasitic capacitances and inductances added.

The added parasitics are defined as followed:

(i) The serial inductance between the DC-DC converter integrated circuit output and the external output capacitor is modeled as an inductance, Lout. Its charge induces an overshoot on SAP. Its time constant is defined as:

$$\tau_L = \frac{L_{out}}{R_{on}}$$

(ii) The gate of the DC-DC power switches are modeled as a capacitance. Their sum seen on SAM pin is named Cgate. It limits the overshoot on SAP. Its time constant is defined as:

$$\tau_{gate} = R_{on} \times C_{gate}$$

In this condition, the maximum voltage on DC-DC converter SAP pin can be shown to be:

$$SAP_0 = \frac{VUP_0}{2} \times \left(1 - \frac{\tau_{gate}}{\tau_L + \tau_{gate}}\right) \times \left(1 + \left(\frac{\tau_{gate}}{\tau_L + \tau_{gate}}\right)^{\frac{\tau_{gate}}{\tau_L}}\right) + VIN$$

This formula derives from a circuit analysis of FIG. 6.

FIG. 7 shows the maximum voltage on the DC-DC converter SAP pin (value SAPmax at time t=ϵ) versus the parasitic serial inductance. This example is given for 4.5V input voltage, 5.5V output and a 1 nF gate parasitic gate capacitance. The switching capacitor Csw in this example is 330 nF and the load capacitor is 250 nF. The on resistance RON is modeled as 0.5 Ω.

This example shows two main issues:

(i) A large range of DC-DC maximum voltage from 7.25V to 9.5V is obtained as a function of the parasitic inductance.

(ii) There is no possibility for the customer to reduce the DC-DC maximum voltage by playing with COUT or CSW.

In fact, this maximum appears as an overshoot just at the beginning of the store (i.e. discharging) phase P3.

FIG. 8 shows the transient behaviour of the capacitor terminal pins with and without parasitics. The solid SAP and SAM lines are with parasitics and the dashed lines are without.

This overshoot is critical to the DC-DC converter operation as it generates noise (EMC and switching noise). Therefore it adds design constraints on the DC-DC converter implementation as the DC-DC internal components should handle the electrical overstress. The DC-DC converter electrical performance is more dependent on the customer application than the silicon.

SUMMARY

The invention is defined by the claims.

According to an example, there is provided a DC-DC converter, comprising:
a switched capacitor arrangement;
a filter capacitor connected between one terminal of the switched capacitor arrangement and a fixed voltage line; and
a calibration arrangement for determining the capacitance of the filter capacitor.

This converter has a filter capacitance coupled to the switching capacitor arrangement, which is added to reduce the voltage overshoot of the circuit. In this way, a trade-off is found between a lower DC-DC converter overshoot voltage and a high current capability. The capacitor removes or reduces the overshoot and thus reduces switching noise on the DC-DC converter input and output voltages, and thereby increases IC life time. The capacitance is chosen in order to keep a desired DC-DC converter current capability.

This can address the problem that a capacitive DC-DC converter is sensitive to external parasitic inductances (package bounding, PCB wires) which can induce overshoot voltage on the converter pins, increasing noise on the input and output voltages.

The filter capacitance selected then takes into account the parasitics from the customer application as a result of the use of a calibration operation.

The filter capacitor can be a variable capacitor, so that the value can be set following a calibration operation. The calibration arrangement can then comprise a controllable current source for drawing a controllable current from the converter output. This can be used to simulate the maximum DC load current condition to be tolerated, and thereby simulate the conditions where the peak overshoot will be experienced.

The calibration arrangement can comprise a memory for storing the desired capacitance value.

The switched capacitor arrangement can comprise:
a capacitor arrangement;
a switching arrangement for controlling coupling of the capacitor arrangement to a converter input during a loading phase and to a converter output during a storing phase; and
a circuit for controlling the switching arrangement.

The capacitor arrangement can have a first terminal and a second terminal, wherein the first terminal connects through a first switch to the input and through a third switch to the output, and wherein the second terminal connects through a second switch to ground and through a fourth switch to the input. This defines a basic DC-DC converter architecture.

The filter capacitor can then connect between the second terminal and the fixed voltage line, which can he ground. The capacitor arrangement can comprise a single capacitor.

There is also provided an RF communications circuit, comprising:
a receiver and/or transmitter circuit; and
a converter for providing the power supply for the receiver and/or transmitter circuit from a battery.

The receiver and/or transmitter circuit can comprise a near field communication circuit.

There is also provided a DC-DC conversion method, comprising:
performing a calibration of a DC-DC converter, which comprises a switched capacitor arrangement;
determining the size of a filter capacitor to be connected between one terminal of the switched capacitor arrangement and a fixed voltage line based on the calibration.

The calibration can involve setting a variable capacitor which is part of the converter circuit, or determining the size of a capacitor to be connected to the converter circuit as part of a user configuration.

BRIEF DESCRIPTION OF THE DRAWINGS

Examples will now be described in detail with reference to the accompanying drawings, in which.

DETAILED DESCRIPTION

This application describes a DC-DC converter using a switched capacitor arrangement. A filter capacitor is connected between one terminal of the capacitor arrangement and a fixed voltage line and a calibration arrangement is used for setting or enabling selection of the capacitance of the filter capacitor.

In this way, a capacitance is added to a terminal of the switched capacitor arrangement. The capacitance value can be chosen or adjusted to keep the DC-DC converter current capability within specification limits.

This adjustment or selection can be implemented in two ways:

(i) Using an external capacitor

In this case, the capacitance can be chosen by the customer. The DC-DC converter IC can be designed for the worst case condition for the required DC-DC converter current capability, which normally represents the highest operating temperature. The DC-DC converter is loaded with the maximum load current by the calibration arrangement, and the added filtering capacitance is then adjusted until the desired DC-DC converter overload is reached. That capacitance value is then used.

This provides a simple solution, but it does require an external component and it requires adjustment by the customer.

(ii) Using an internal tuneable capacitor

In this case, an internal programmable capacitance can be used, and a calibration procedure can be followed to set the value. This avoids the need for an external component but adds complexity to the silicon IC.

Figure 9:
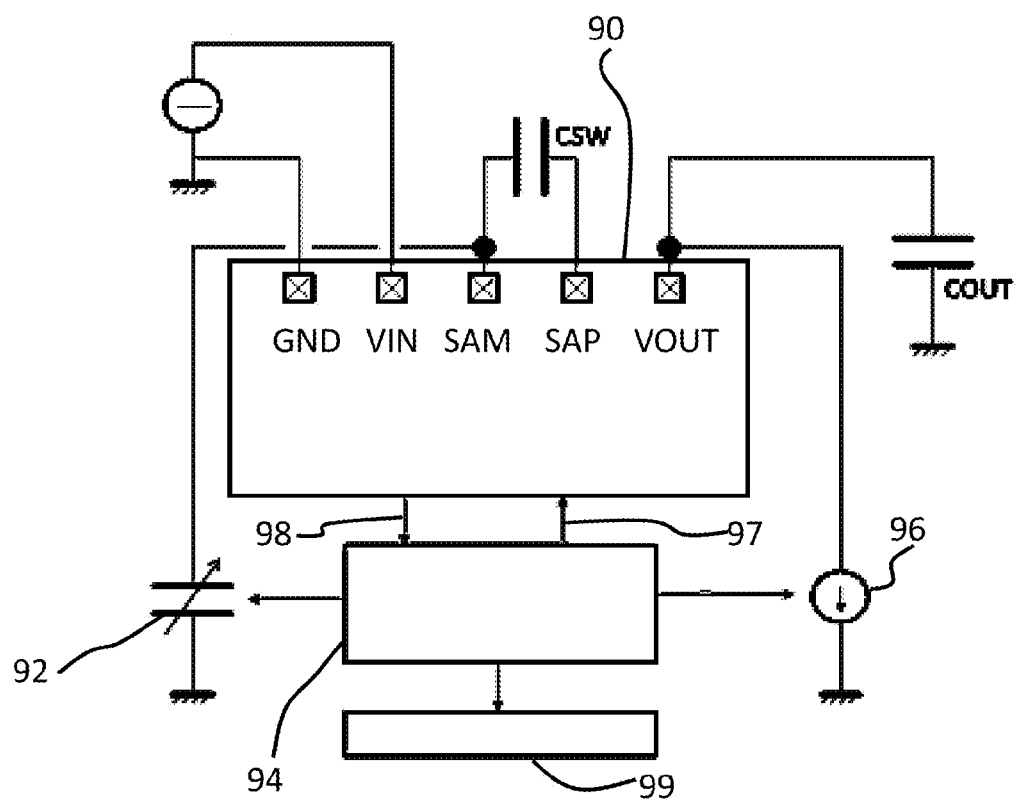
FIG. 9 shows an example of DC-DC converter circuit.

An implementation making use of an internal tuneable capacitance will now be described with reference to FIG. 9.

The main DC-DC converter circuit 90 can be of conventional design.

Figure 1:
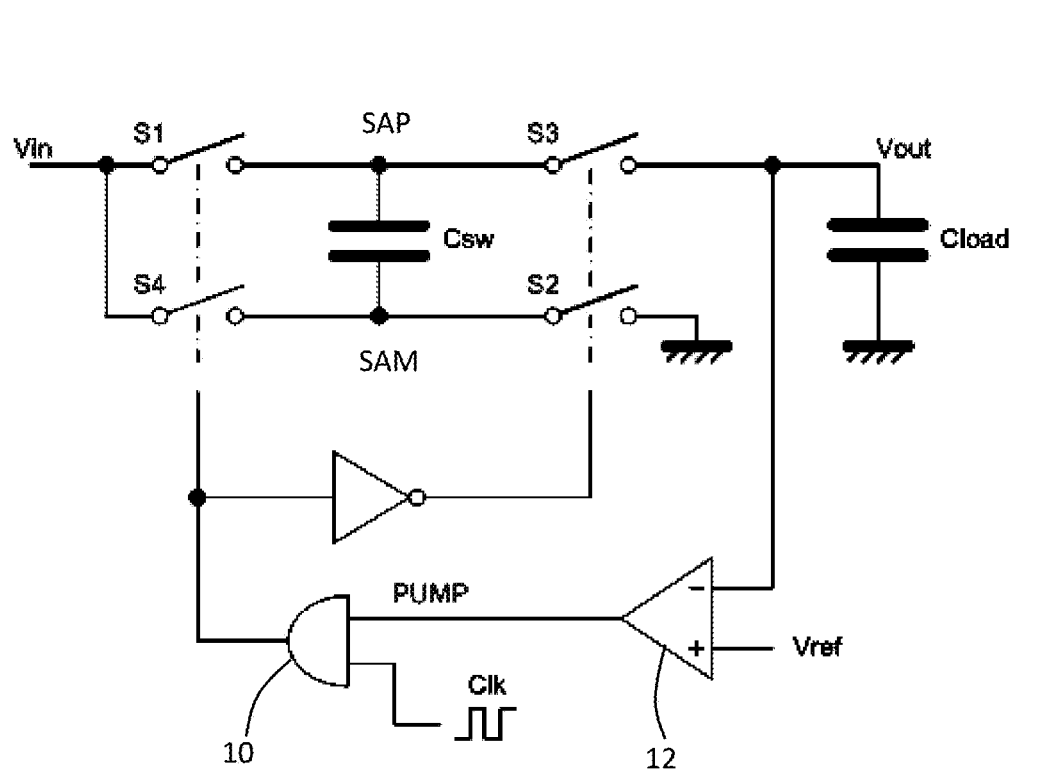
FIG. 1 shows a known DC-DC converter circuit.

One possible implementation of the converter is that shown in FIG. 1. In this example, the switched capacitor arrangement comprises a capacitor arrangement in the form of a single capacitor Csw, and a switching arrangement for controlling coupling of the capacitor arrangement to a converter input during a loading phase and to a converter output during a storing phase. A circuit controls the switching arrangement.

The capacitor arrangement has a first, SAP, terminal and a second, SAM, terminal. The first terminal SAP connects through a first switch S1 to the input and through a third switch S3 to the output, and the second terminal SAM connects through a second switch S2 to ground and through a fourth switch S4 to the input.

It is known for the converter circuit to have external pins for the input VIN, output VOUT and ground GND connections, as well as for connection to the two terminals SAM and SAP of the switching capacitor CSW. These external connections are shown in FIG. 9.

Thus, the switching capacitor is external to the integrated circuit which carries the converter switches and control circuitry.

The output capacitor COUT connects between ground and the output VOUT.

This implementation provides a variable capacitor 92, shown with a value CFILTER, connected between one of the switching capacitor terminals and ground, in particular the terminal SAM in the example shown.

The setting of the capacitor is controlled by a calibration arrangement 94 which can be in the form of an algorithm operated by a processor. For the purposes of the calibration, a programmable current source 96 is provided for loading the DC-DC converter output.

The programmable capacitance 92 essentially functions to filter the DC-DC converter switching node SAM.

During the calibration phase, the load current is set at a maximum specified limit by controlling the current source 96.

The filtering capacitance 92 is then calibrated in order to reach the desired DC-DC converter overload.

Figure 2:
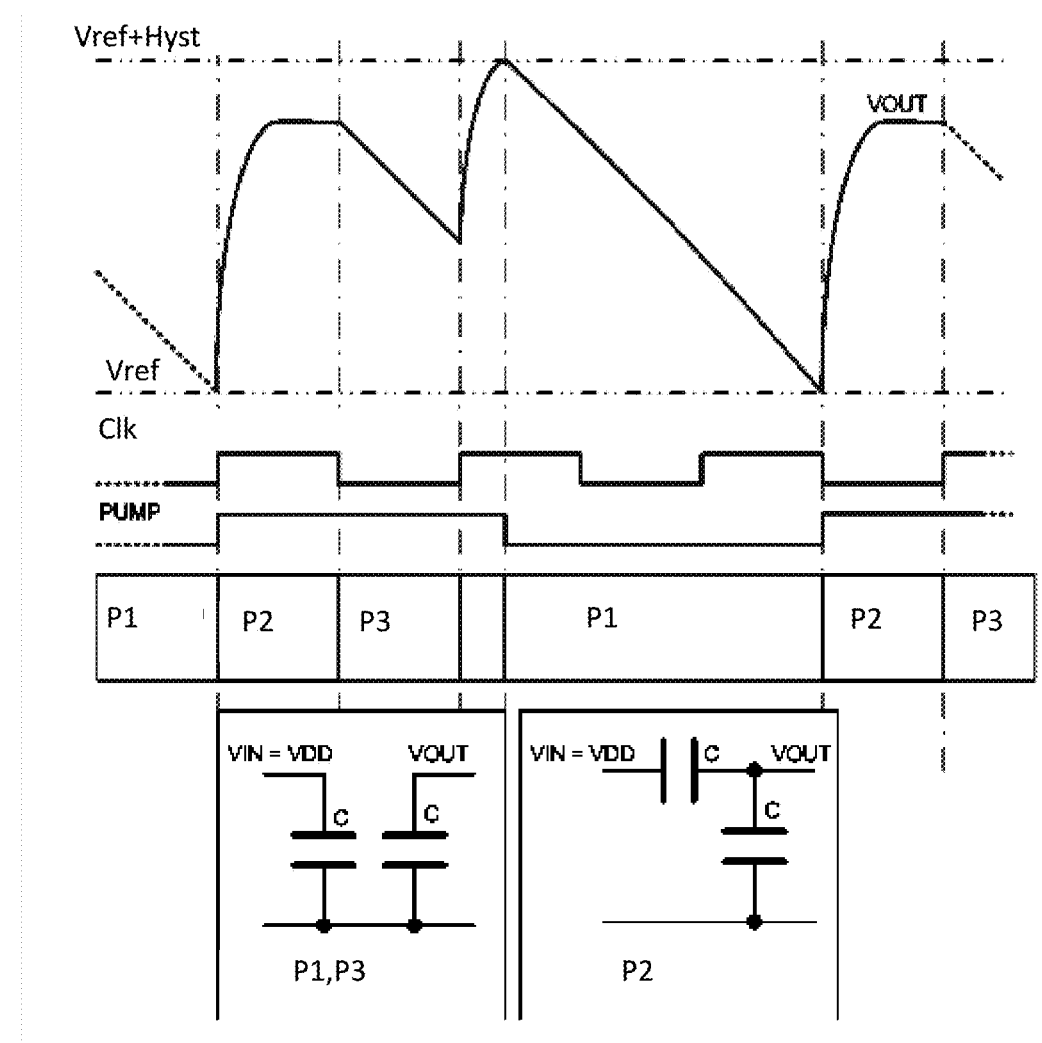
FIG. 2 shows timing diagrams for the circuit of FIG. 1.
Figure 3:
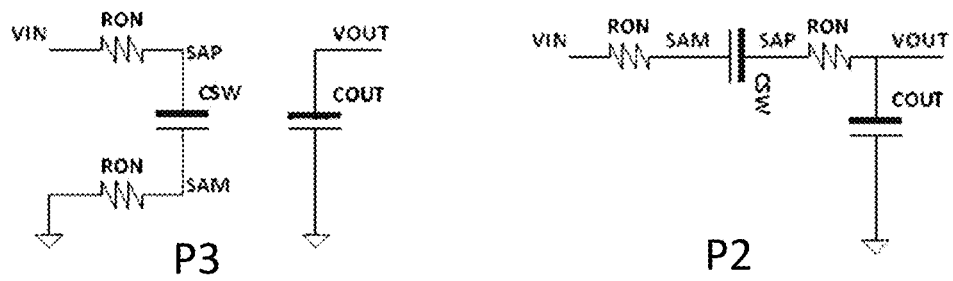
FIG. 3 shows the equivalent circuit diagrams for the two cycles of the circuit of FIG. 1, with equivalent resistances added.
Figure 4:
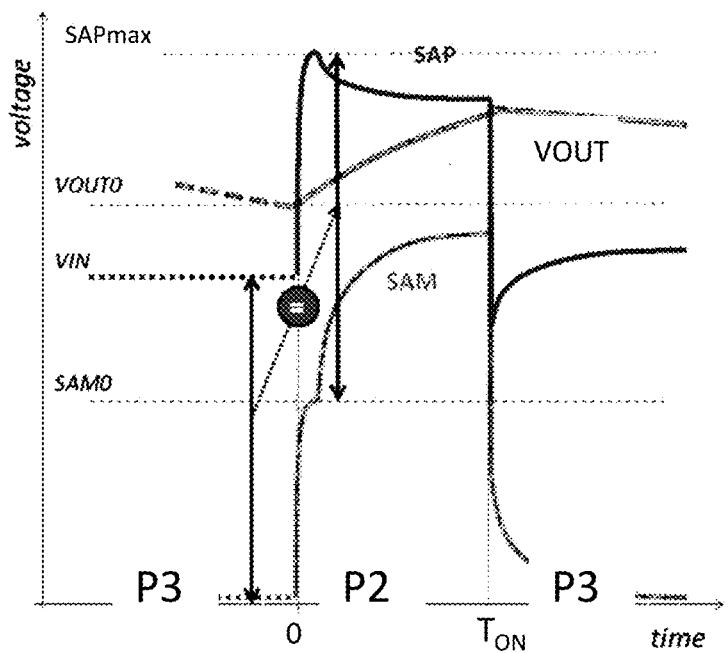
FIG. 4 is a timing diagram used to explain the problem of voltage overshoot.
Figure 5:
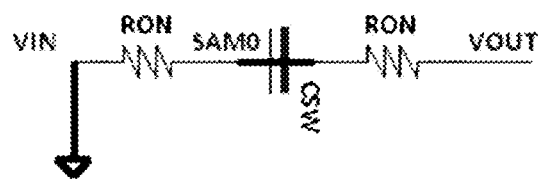
FIG. 5 shows the equivalent circuit at the beginning of the loading phase.
Figure 6:
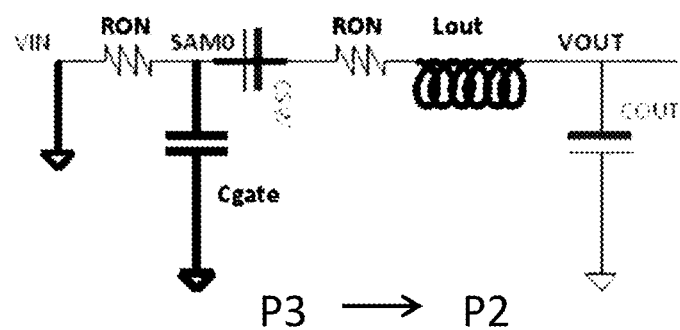
FIG. 6 shows the equivalent circuit at the beginning of the loading phase including parasitics.
Figure 7:
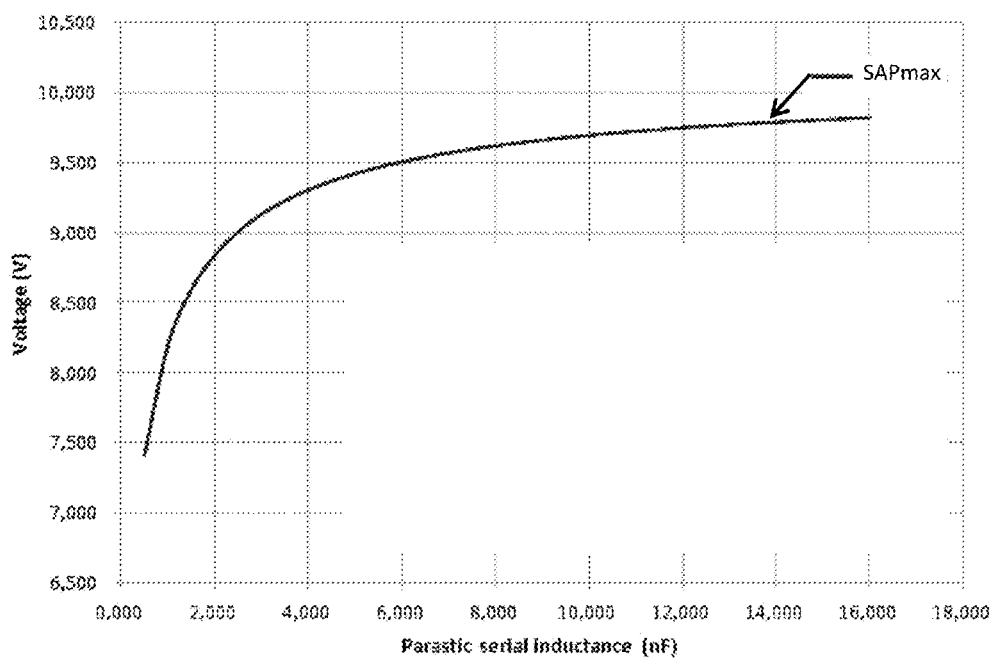
FIG. 7 shows the effect of parasitic inductances on the maximum output voltage.
Figure 8:
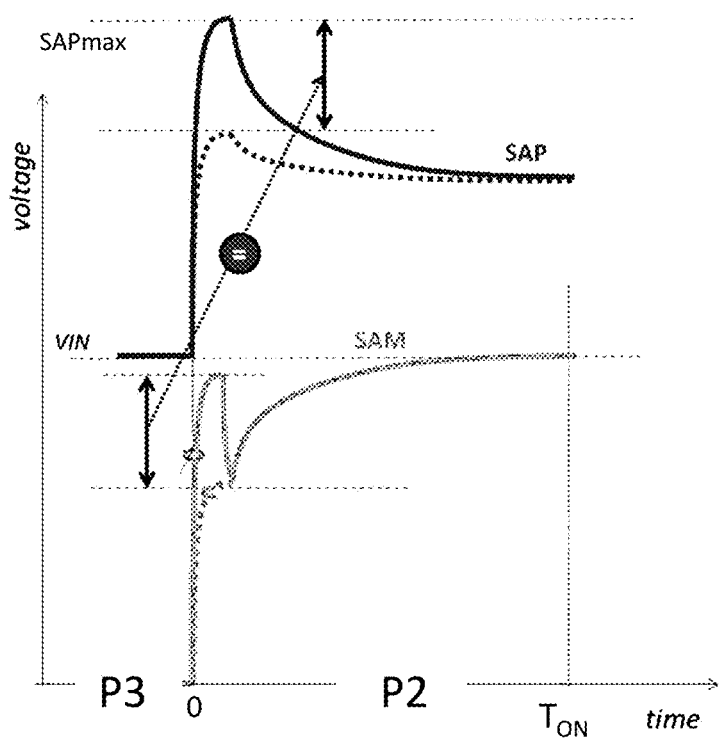
FIG. 8 shows the effect of parasitics on the timing diagram of FIG. 4.

The DC-DC converter overload is provided by controlling the DC-DC converter operation, in particular by controlling the converter always to pump, with no stop-pump phase (Phase P1 in FIG. 2).

When the DC-DC converter is always pumping, it means that its load current is higher than its current capability, so it is no longer able to regulate its output voltage. This output voltage therefore decrease slightly. Thus, overload is detection is based on when the DC-DC converter cannot regulate its output voltage.

An overload detection for the DC-DC converter can therefore be performed by sensing its output voltage. Voltage detection using analogue techniques consumes die area and is slower compare to a digital implementation, so that a digital version is preferred. In this case, detection can be achieved with a simple flip flop circuit, for example by latching the signal "PUMP" (FIG. 1) with the clock reference, and a digital interrupt can be generated when a counter result is above a time out value.

For a digital time counter, a time out can for example be set to 128*reference clock. This provides a trade off on silicon between a quick detection and compensating for PVT influences.

The calibration arrangement 94 has outputs for controlling the current source 96, for setting the variable capacitor 92, and also for enabling the converter (control line 97) and for receiving the overload indicator (input line 98).

The determined capacitance value to be used is stored in a memory 99.

The calibration can be implemented with an offline calibration (i.e. a calibration performed before enabling the DC-DC converter) or it can be performed with an online calibration (i.e. during operation). An online calibration enables the filtering capacitance to be adjusted to the customer load current.

The filter capacitance required for the capacitor 92 will depend on the load, as well as the customer requirements.

In one example, the switching capacitor may be 330 nF and the filter capacitor will then typically have a size of a small number of nF.

By way of more general example, the filter capacitor can typically be in the range of 0.1% to 10% of the (total) capacitance of the switching capacitor arrangement.

Figure 10:
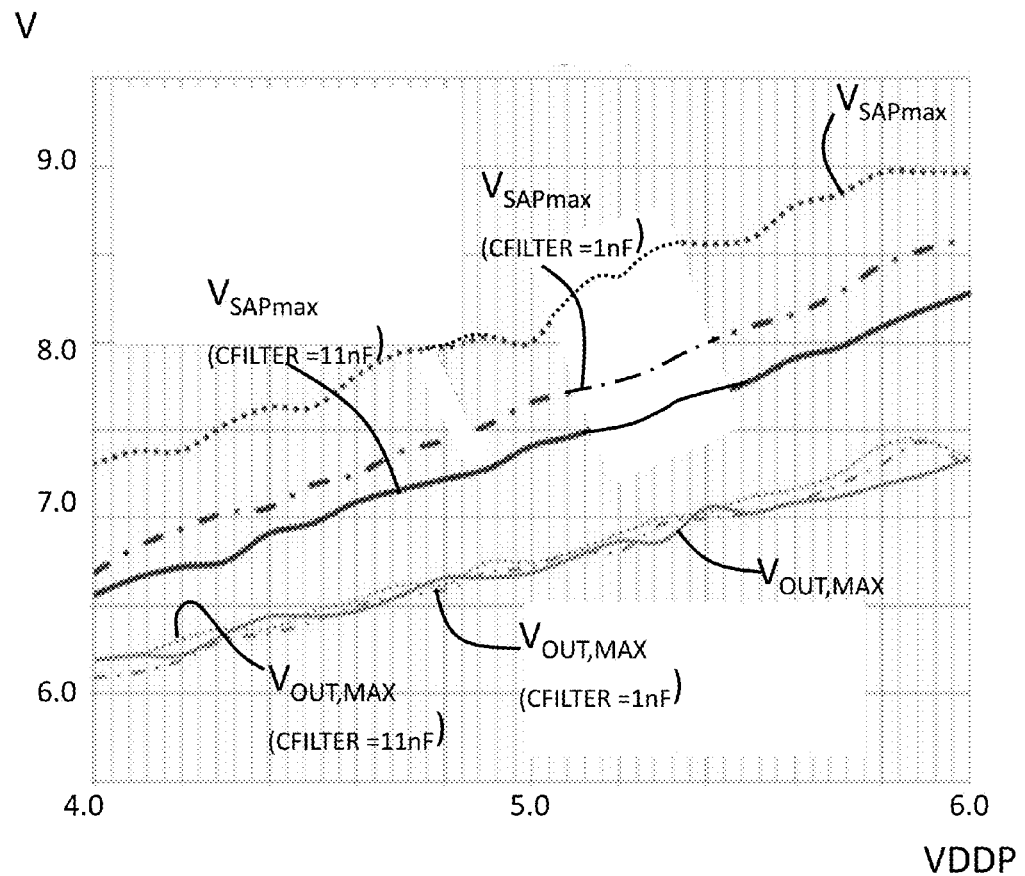
FIG. 10 shows the effect on the output voltage to explain a benefit of the converter circuit.

FIG. 10 shows results obtained based on two different capacitances (1 nF and 11 nF) connected to the terminal SAM, as well as the case with no filter capacitor.

FIG. 10 is based on a commercially available converter. The maximum voltage seen on the pins SAP and VOUT is plotted against the input supply voltage VDDP.

The maximum voltage seen on the SAP terminal is reduced thanks to this capacitance.

It has been shown that the noise generated on the supply voltage line VCC by the SAP overshoot is halved when 11 nF capacitance is added to the SAM node.

Some examples enable a reduction of the switching noise and reduced EMC interference. The converter becomes less sensitive to the particular customer application. The circuit life time can be improved, and better accuracy of the DC-DC converter current protection. The added capacitance can be trimmed in order to adjust the DC-DC overload current to be at the specified limit.

DC-DC converters of this type have application in many different fields. One example is for near field communication ("NFC") applications, such as RFID applications. NFC systems are for example used for contactless secure communication with a smart card. In this application, an NFC device can operate in card mode or in reader mode.

In card mode, the NFC device acts as a contactless smart card, whereas in reader mode, the NFC device acts as a contactless smart card reader.

When operating in reader mode, the NFC product sends a magnetic field for powering the card (the voltage from the field energy is filtered by the card to generate a supply voltage for the card) and for data exchange between the card and the NFC device. This communication makes use of amplitude modulation.

The NFC front end executes RF polling loops for detecting the card. Once a card is introduced inside the field, data exchanges are performed.

The main market for this type of contactless NFC device is mobile applications. In such customer applications, the NFC circuitry is supplied directly from the mobile battery. These NFC devices should operate over the battery voltage range.

To provide a constant communication distance, the supply voltage of the NFC transmitter should be stable over the battery voltage range. For providing a higher communication distance, the supply voltage of the NFC transmitter should be as high as possible. To meet high and stable communication distance, a DC-DC boost converter is needed for supplying the NFC transmitter from the mobile device battery.

In the example above, the switching capacitor arrangement is a single capacitor. However, a more complicated capacitor network can be used.

The use of an internal variable capacitor is described in detail above, with a calibration system that can be largely automated. The alternative of a manually selected capacitor is analogous, and essentially corresponds to a manual version of the same process. The user then configures a current source to draw the required peak current from the output, and connects different capacitors in circuit, or else adjusts a variable capacitor, while taking the required measurements to determine the resulting voltage overshoot. The current source used, and the circuitry for providing voltage overshoot measurements again constitute a calibration arrangement.

From these measurements, the capacitor to be used is selected, or the required setting of a variable capacitor is established.

The calibration arrangement described above makes use of a controller. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A DC-DC converter, comprising:
    a switched capacitor arrangement that includes a switching capacitor connected between a plurality of switches, the switched capacitor arrangement configured and arranged to operate in a first phase during which the switching capacitor is charged by an input to the DC-DC converter and a second phase during which the switching capacitor is discharged to an output of the DC-DC converter;
    a filter capacitor connected between one terminal of the switching capacitor arrangement and a fixed voltage line; and
    a calibration arrangement configured to determine and adjust a capacitance of the filter capacitor.

2. A converter as claimed in claim 1, wherein the filter capacitor is a variable capacitor that is configured to reduce an overshoot of the DC-DC converter during the second phase.

3. A converter as claimed in claim 2, wherein the calibration arrangement comprises a controllable current source for drawing a controllable output current from the output, and wherein the calibration arrangement is configured to simulate conditions where overshoot of the DC-DC converter occurs during the second phase.

4. A converter as claimed in claim 3, wherein the calibration arrangement further comprises a memory configured to store, in response to calibration operation, a value of the capacitance of the filter capacitor.

5. A converter as claimed in claim 1, wherein the switched capacitor arrangement comprises:
    a first set of switches configured to connect, during the first phase, the switching capacitor between the fixed voltage line and the input,
    a second set of switches configured to connect, during the second phase, the switching capacitor between the input and the output of the DC-DC converter, and
    a circuit for controlling the switching arrangement.

6. A converter as claimed in claim 5, wherein the output of the DC-DC converter is connected to an output electrical line that provides parasitic inductance that causes an overshoot of the DC-DC converter during the second phase.

7. A converter as claimed in claim 6, wherein the calibration arrangement is configured to determine the capacitance of the filter capacitor in response to detecting the overshoot.

8. A converter as claimed in claim 5, wherein the fixed voltage line is ground.

9. A converter as claimed in claim 1, further comprising a circuit configured to control the switched capacitor arrangement in response to a comparison between a voltage on the output and a reference voltage level.

10. An RF communications circuit, comprising:
    a receiver and/or transmitter circuit; and
    a converter as claimed in claim 1 for providing a power supply for the receiver and/or transmitter circuit from a battery.

11. A circuit as claimed in claim 10, wherein the receiver and/or transmitter circuit comprises a near field communication circuit.

12. A DC-DC conversion method, comprising:
    performing a calibration of a DC-DC converter, which comprises a switched capacitor arrangement that includes a switching capacitor connected between a plurality of switches, the switched capacitor arrangement configured and arranged to operate in a first phase during which the switching capacitor is charged and a second phase during which the switching capacitor is discharged to an output of the DC-DC converter;

determining and adjusting a capacitance of a filter capacitor connected between one terminal of the switching capacitor arrangement and a fixed voltage line.

13. A method as claimed in claim 12, wherein determining the capacitance of the filter capacitor is in response to overshoot of the DC-DC converter during the second phase.

14. A method as claimed in claim 13 wherein the determining includes drawing a controlled output current from the output while regulating a voltage on the output and determining a resulting voltage overshoot arising in the DC-DC converter, and further comprising selecting the capacitance of the filter capacitor to reduce the overshoot.

15. A method as claimed in claim 12, further comprising operating the DC-DC converter by alternating between the first and second phases until a voltage on the output rises above a reference voltage.

* * * * *